Sept. 23, 1941.     F. W. SCHWINN     2,256,629
BICYCLE CARRIER
Filed March 4, 1939     4 Sheets-Sheet 3

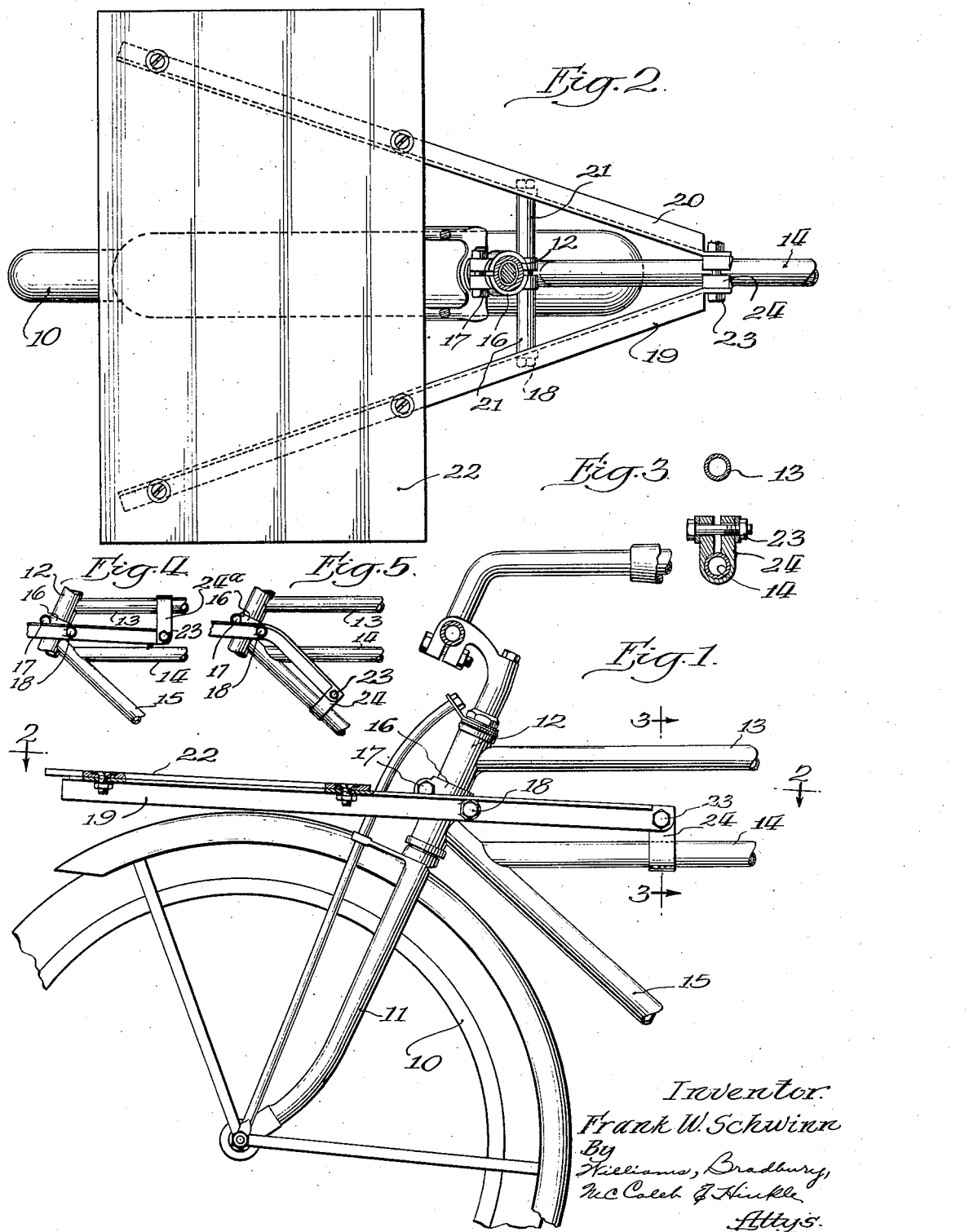

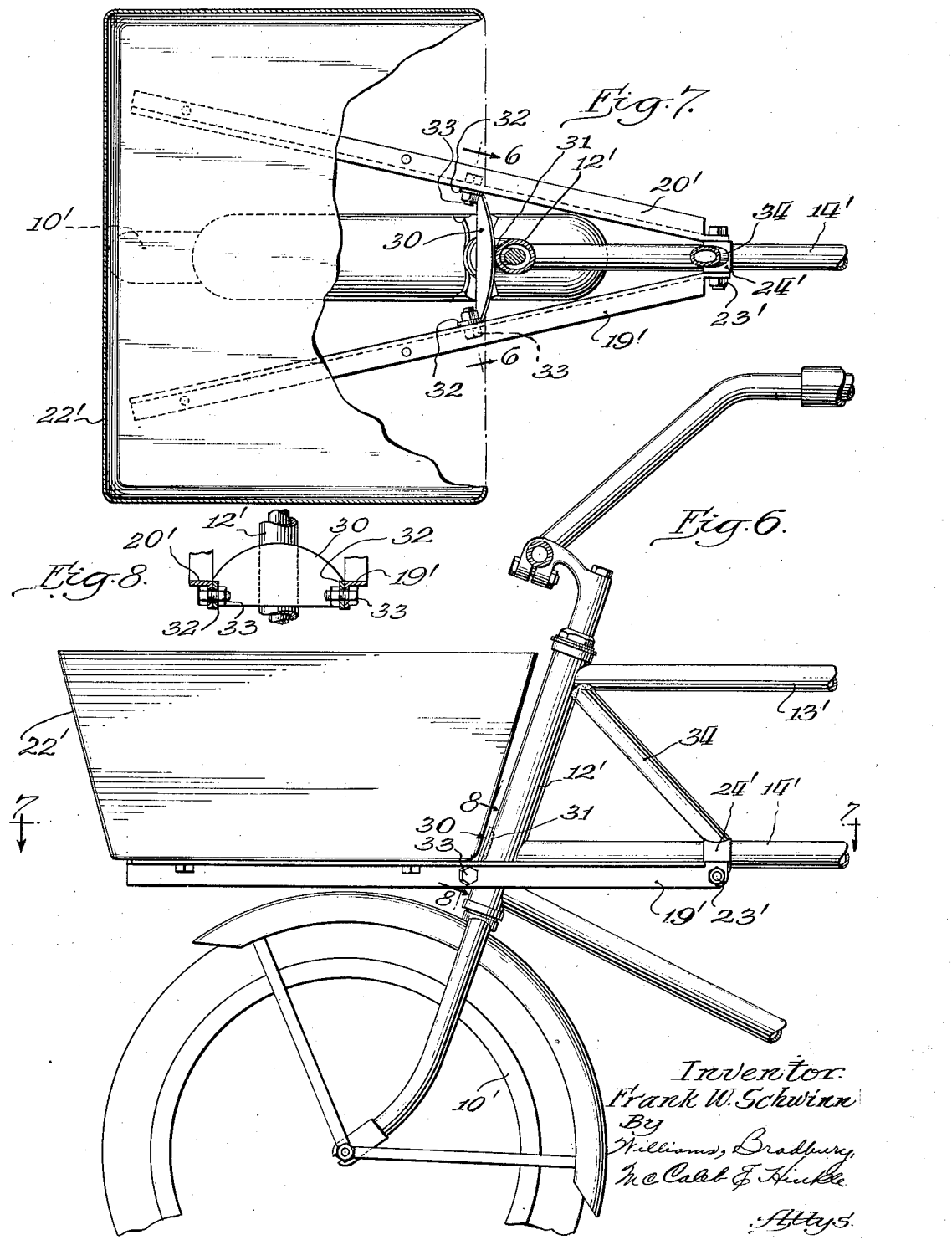

Inventor:
Frank W. Schwinn
By
Williams, Bradbury, McCaleb & Hinkle
Attys.

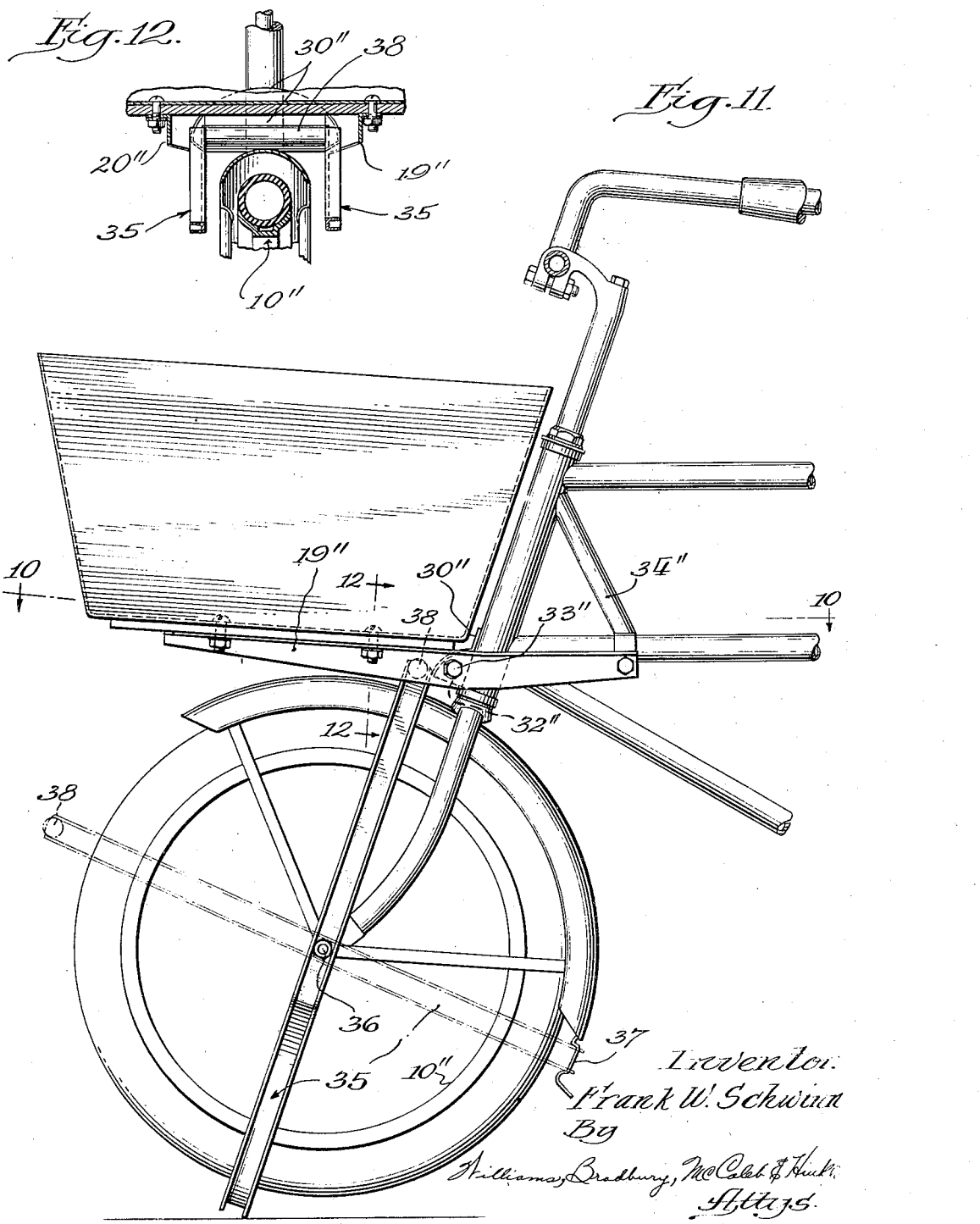

Patented Sept. 23, 1941

2,256,629

UNITED STATES PATENT OFFICE 2,256,629

BICYCLE CARRIER

Frank W. Schwinn, Chicago, Ill.

Application March 4, 1939, Serial No. 259,739

1 Claim. (Cl. 224—32)

My invention relates to bicycle carriers, and especially to package carriers mounted at the front end of a bicycle and supported directly on the frame, as distinguished from front carriers which are mounted on the front fork or handlebars.

One object of my invention is an improved mounting for such a carrier whereby the carrier is securely mounted on the frame by a cantilever arrangement, so that the weight of the load is carried primarily directly by the steering head and secondarily by an upward thrust on one of the rearwardly extending frame members.

Another object of my invention is a sturdy front carrier which may readily be attached to and detached from the bicycle frame and which, when detached, avoids any unsightly appearance of the bicycle. An alternative object is to provide a front carrier mounting which is more or less permanent, although it too may be detached for shipment in a flat bicycle crate.

Still another object is to resist the tendency, under the increased load on the bicycle, of the upper end of the steering head to push backwardly, by utilizing the weight of the carrier load itself to oppose that tendency.

A further object is a front carrier so constructed and arranged that it may cooperate with a front wheel stand to hold the stand in parking position and to hold the front wheel and its stand against turning.

Further objects, features and advantages of my invention are set forth in the following description of specific embodiments thereof which are illustrated in the accompanying drawings wherein:

Fig. 1 is a side elevation of the front of a bicycle showing my carrier mounted thereon;

Fig. 2 is a plan section taken on the line 2—2 of Fig. 1;

Fig. 3 is a transversely rearwardly looking section taken on the line 3—3 of Fig. 1;

Figs. 4 and 5 are detail side elevations similar to a fragment of Fig. 6 but on reduced scale, showing modifications of the mounting of Fig. 6;

Fig. 6 is a side elevation of the front end of a bicycle similar to Fig. 1, but showing a modified form of carrier;

Fig. 7 is a plan section taken on the line 7—7 of Fig. 4;

Fig. 8 is a rearwardly looking transverse section taken on the line 8—8 of Fig. 6;

Fig. 11 is an elevation of the front end of the bicycle of Fig. 9, but showing the stand in parked position; and Fig. 12 is a transverse vertical section taken on the line 12—12 of Fig. 11.

Figure 9:
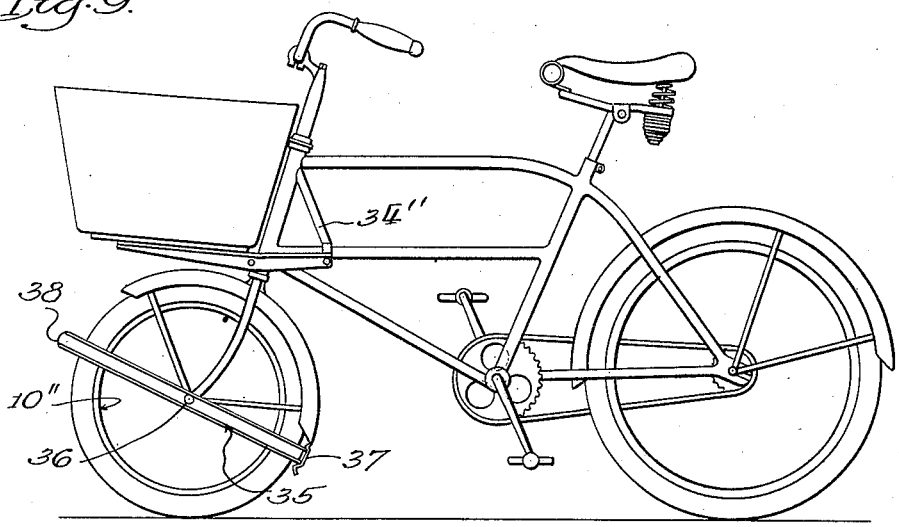
Fig. 9 is a side elevation of a delivery bicycle with a front wheel stand and a carrier like that of Fig. 6, but modified to cooperate with the stand.

Referring first to the form of Figs. 1, 2 and 3, I have shown a standard bicycle construction including a front wheel 10 and a trussed fork 11 journaled in the steering head 12 of a frame which has rearwardly extending upper and lower horizontal frame members 13 and 14 and a rearwardly and downwardly extending frame member 15. It will be understood that the frame members 13 and 14 extend rearwardly to the seat head of the frame and that the member 15 extends down to the pedal crank bearing.

To this standard bicycle frame I attach my carrier. The main mounting of the carrier is effected by a pair of C-shaped clamps 16 which together encircle the steering head 12 and are clamped together by bolts 17 and 18. The clamps are mounted just above the junction of the frame member 15, so that the latter serves as an abutment against downward movement of the clamps.

The carrier is framed by a pair of rearwardly converging beams 19 and 20, conveniently formed of lengths of angle iron, one on each side of the frame. The clamping bolt 18 is much longer than the clamping bolt 17 and extends through holes in the vertical flanges of the two beams 19 and 20 as well as through spacing sleeves 21, which serve to hold the carrier frame centrally of the bicycle frame. The platform 22 of the carrier is bolted or screwed to the beams 19 and 20. The converged rearward ends of the beams 19 and 20 are bolted at 23 to a stirrup 24 which depends from the beams to encircle the lower horizontal frame member 14 about a foot back from the steering head.

If desired, and especially where the bicycle frame does not include a lower horizontal member 14, the stirrup may be in the form of a compression stirrup 24a encircling the upper horizontal frame member 13 as shown in Fig. 5; or, alternatively, the beams 19 and 20 may be bent downwardly into parallelism with the oblique frame member 15 and anchored thereto by the stirrup 24. The stirrup is sufficiently flexible to permit its ends to be spread apart for passing the stirrup over the frame member.

The carrier may be readily removed from the bicycle by withdrawing the bolts 18 and 23 and, if desired, the clamps 16, 17 and the stirrup 24 may also be removed. My carrier lends itself well to being sold separately as an accessory for any standard bicycle. When the carrier is sold as original equipment, however, it can be shipped detached from the bicycle but, being planar, can easily be included in the regular flat bicycle crate.

The carrier platform—or a basket or box fixed to the beams in lieu of the platform—may be carried substantially as low as the form of front wheel carrier which is supported on the fork or axle and turns with the fork. Because my carrier, and its load, does not turn with the handlebars, but is carried directly by the bicycle frame, it does not interfere with or handicap the steering of the bicycle by adding to the turning moment of the handlebars and fork. Further, because the attachment of the carrier to the bicycle frame is a rigid one, lateral shifting of the carrier and its load (at least if the load is securely anchored to the carrier) relative to the bicycle frame is precluded and this makes for greater riding stability.

The oblique disposition of the beams 19 and 20 serves in lieu of oblique struts to preclude what might otherwise be a parallelogrammatic distortion of the carrier frame. The rearward convergence of the beams also brings them clear of interference with the rider's knees and yet the beams support the outer margins of a wide platform.

The cantilever mounting of the carrier upon the steering head with a rearward anchorage well back from the steering head upon one of the rearwardly extending frame members, relieves the steering head of the wrenching strains which would obtain if the carrier were mounted only on the steering head.

Despite the added weight of the load on the carrier, the bicycle will maintain its normal characteristics of balance because the weight of the load is borne primarily by the fulcrum bolt 18, which is substantially at the axis of the journal of the front fork and in line with the road contact of the front wheel.

By my carrier and its mounting, I am able to carry greater loads and loads of greater over-all size without requiring special construction features in the bicycle and without the necessity of building the bicycle with any stronger parts than usual.

In Figs. 6, 7 and 8, I have shown a modified form of carrier mounting and a modified form of bicycle frame. In this form the bicycle is made to take the carrier, and the carrier is more or less permanently mounted, although it can easily be removed for shipping in a flat bicycle crate. In this form the front wheel 10' is small and the steering head 12' is correspondingly deeper with a wider spacing between the upper horizontal frame member 13' and the lower member 14'. As a result the beams 19' and 20' of the carrier frame can be set lower and carry a higher load.

The fulcrum mounting for the beams comprises a transverse plate 30 permanently attached to the front of the steering head 12' near its lower end, as by welding 31. Ears 32 at the ends of the plate 30 are turned into parallelism with the beams, and bolts 33 pass through the ears and the vertical flanges of the angle iron beams in effect to fulcrum the beams. The converged rearward ends of the beams 19' and 20' are anchored by a bolt 23' to a collar 24' on the lower horizontal frame member 14'. In this form, in lieu of a platform, I have shown a box or basket 22', the bottom of which may be bolted to the beams. By removing the bolts 33 and 23' the carrier may easily be removed.

In the form of Figs. 6, 7 and 8, I have shown an embodiment incorporated in the bicycle frame which is of peculiar advantage in connection with this type of carrier. This embodiment consists in the addition of an oblique strut 34 in the plane of the bicycle frame extending at an angle of about 45° from the junction of the upper frame member 13' with the steering head 12' to the lower horizontal frame member 14' at the origin of the anchoring bolt 23'. The junction of the strut 34 with the lower frame member 14' may conveniently be at the collar 24 as shown. It will be understood that the tubular strut 34 is rigidly joined at its ends to the other frame members in the manner characteristic of bicycle frame construction.

The principal function of the strut 34 is this: The normal reaction of the steering head of a bicycle frame to the bicycle load is for the lower end of the steering head to assert a forward pressure and the upper end of the steering head to assert a rearward pressure. When, to the normal weight of the rider, there is also added the extra weight of a carrier load, this rearward force of the upper end of the head is considerably increased. The strut 34, which I have added, effectively resists this added strain. With the carrier load fulcrumed upon the bolts 33, the rearward ends of the beams assert an upward push on the bolt 23' proportionate to the carrier load, and this upward force is in turn applied as a compression force to the lower end of the strut 34, resolving it to the upper end of the steering head to resist the tendency of the upper end of the steering head to move rearwardly. In this way a great load can be carried by the cantilevered carrier without enlarging the size of the bicycle frame members or making any change in the bicycle frame other than the inclusion of the strut 34.

By the use of the strut 34, the greater the load on the carrier frame, and consequently the greater the tendency of the upper end of the steering head to press rearwardly, the greater is the resisting thrust of the strut 34.

In Figs. 9 to 12, inclusive, I have illustrated a form of my invention which is similar to that shown in Figs. 6 to 8, but where the carrier has been modified for cooperation with a front wheel stand. In this form, a stand 35 is provided for the front wheel 10''. The stand 35 is pivotally mounted on the axle 36 of the front wheel. The stand is formed from a strip of channel-shaped cross section bent into the form of a U with the legs of the U lying at either side of the front wheel and the web of the U resting on the ground, as shown in Fig. 11, or, when the stand is not in use, engaged by a clip 37 carried by the lower end of the front wheel fender. The legs of the U-shaped stand are projected across the wheel where they are interconnected by a bar 38 diametrically opposite the web of the U. When the stand is in the riding position of Fig. 9, the bar 38 projects somewhat forwardly of the wheel after the fashion of a bumper.

When the stand is to be used for parking the bicycle, the clip 37 is released and the stand is swung clockwise about the axle 36 to the full line position of Fig. 11, which is somewhat past dead center. As the stand is swung into that position, the bar 38 swings between the converging beams 19″ and 20″ and comes to rest when it abuts the forward ends of the ears 32″ of the plate 30″. At this point the distance between the beams 19″ and 20″ is but slightly greater than the length of the bar 38. The vertical flanges of the angle shaped beams 19″ and 20″ are deepened adjacent the bolts 33″ to serve as lateral guides for the bar 38 in leading it into abutment with the ears 32″.

The weight of the front end of the bicycle and its carrier load is applied through the axle 36 to the stand at a point a little rearwardly from the bottom of the stand, and this tends to hold the bar 38 against the ears 32″.

For a bicycle with a front carrier it is advisable to use a front wheel stand, because the stand then comes directly under the load. If the rear wheel stand were used the remoteness of the carrier load would make the bicycle more susceptible to falling. To put it differently, a bicycle racked on a wheel stand represents three points of support. By using a front wheel rack for a front carrier, the load is put over the two points of support rather than over the single point.

One difficulty with a front wheel stand is the tendency of a front wheel and its fork to turn in the steering head. If there is very much turning, the three points of support come so nearly into line that stability of support is lost. This is especially true when it is a front wheel carrier with a load, because that tends to make the bicycle more top heavy.

One of the outstanding advantages of the extension of the front wheel rack to swing up into confining engagement with the carrier, is to preclude turning of the wheel and fork in the steering head. When the extension is in the parked position of Figs. 10, 11 and 12, the steering fork can be turned only by a movement which involves lifting the front end of the bicycle. The greater the load on the carrier, the greater the resistance to such movement.

The cooperation of the stand extension with the carrier frame is thus one which brings the front wheel and fork into steering head position and which precludes turning the wheel and fork in the steering head.

A considerable depth for the vertical flanges for the beams 19″ and 20″, as compared with the construction of Fig. 6, for example, becomes important in providing the proper guiding and retention of the stand extension when the bicycle is in parked position.

Figure 10:
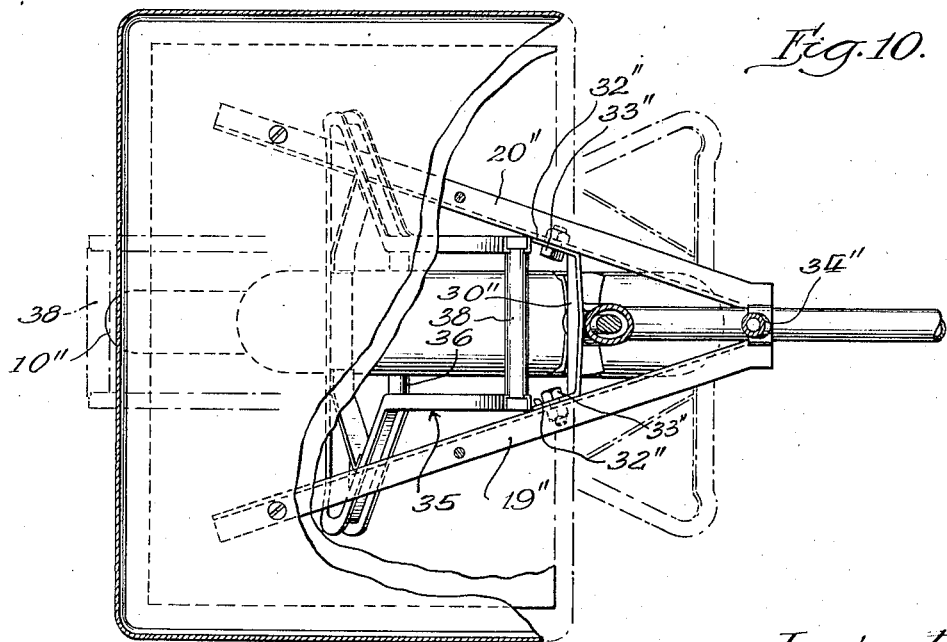
Fig. 10 is a plan section similar to Fig. 7, but showing the modification of Fig. 9.

As will be seen from a comparison of Figs. 6 and 7 with Figs. 9 and 10, in the latter modification the rearward extension of the frame guide beams beyond their fulcrum in the steering head is shortened and the angle of convergence correspondingly increased, with the incidental result that the strut 34″ lies in a somewhat steeper angle.

For the best cooperation of my front wheel stand extension with the carrier frame, the platform of the carrier should be spaced a sufficient distance above the crown of the fender to give clearance for the passage of the bar 38, and yet the vertical flanges of the beams should extend down far enough to serve as guides for the bar as it passes the crown of the fender. Also, the bar 38 describes an arc about the axle 36 as a center, with the result that in passing from the crown or uppermost part of the fender back to abutment with the ears 32″, the bar 38 falls to a lower elevation. For this reason the vertical flanges of the beams are deepened adjacent the ears 32″. But at the same time the flanges must not be deepened to the extent that they interfere with the turning of the fork and fender in the steering head.

Certain phases of my invention involving the front wheel stand are disclosed and claimed in my copending application Serial No. 259,742, filed March 4, 1939.

While I have described and illustrated these specific embodiments of my invention, I contemplate that many changes and departures may be made thereover without departing from the scope or spirit of my invention.

I claim:

The combination with a bicycle frame having a steering head for journaling a front wheel fork and having upper and lower frame members extending rearwardly from the steering head, of a carrier cantilevered forwardly of the frame and comprising a pair of horizontal rearwardly converging beams, one on each side of the steering head, means for mounting the beams upon the steering head laterally thereof, means for anchoring the converged rearward ends of the beams on the lower frame member at a point spaced rearwardly of the head, an oblique strut incorporated in the frame, the lower end being secured to the lower frame member adjacent the anchorage of the ends of the beams and the upper end being secured substantially at the junction of the upper frame member and the steering head, and a parcel support mounted upon the beams forwardly of the steering head.

FRANK W. SCHWINN.